(12) United States Patent
Gomez et al.

(10) Patent No.: US 10,703,997 B2
(45) Date of Patent: Jul. 7, 2020

(54) PROCESS FOR THE TREATMENT OF A GASOLINE BY SEPARATION INTO THREE CUTS

(71) Applicant: IFP Energies nouvelles, Rueil-Malmaison (FR)

(72) Inventors: Adrien Gomez, Lyons (FR); Clementina Lopez Garcia, Irigny (FR); Philibert Leflaive, Mions (FR); Annick Pucci, Croissy sur Seine (FR); Marie Godard-Pithon, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 213 days.

(21) Appl. No.: 15/715,711

(22) Filed: Sep. 26, 2017

(65) Prior Publication Data

US 2018/0086989 A1 Mar. 29, 2018

(30) Foreign Application Priority Data

Sep. 26, 2016 (FR) ...................................... 16 59016

(51) Int. Cl.
*C10G 65/02* (2006.01)
*C10G 45/32* (2006.01)
(Continued)

(52) U.S. Cl.
CPC ............... *C10G 65/02* (2013.01); *B01D 3/40* (2013.01); *B01D 19/0005* (2013.01); *C10G 7/02* (2013.01);
(Continued)

(58) Field of Classification Search
None
See application file for complete search history.

(56) References Cited

U.S. PATENT DOCUMENTS 6,972,086 B2    12/2005  Didillon
9,222,036 B2 *  12/2015  Touzalin ................ C10G 45/10
(Continued)

FOREIGN PATENT DOCUMENTS

FR    2811328 B1    8/2002
FR    3014896 A1    6/2015

OTHER PUBLICATIONS

Search report in corresponding application FR 830573 dated May 3, 2017.

*Primary Examiner* — Derek N Mueller
(74) *Attorney, Agent, or Firm* — Millen, White, Zelano and Branigan, P.C.

(57) ABSTRACT

A process for the desulphurization of a gasoline cut containing sulphur-containing compounds, olefins and diolefins, involving (a) fractionating the gasoline in order to recover a light gasoline cut LCN and a first heavy gasoline cut HCN; (b) desulphurization of the first heavy gasoline cut HCN; (c) partially condensing desulphurization effluent obtained from b) in a manner such as to produce a gaseous phase of hydrogen and $H_2S$ and a liquid hydrocarbon phase HCN of dissolved $H_2S$; (d) separating the liquid hydrocarbon phase HCN into an intermediate gasoline cut MCN and a second heavy gasoline cut HHCN; (e) carrying out a second desulphurization of the second heavy gasoline cut HHCN.

16 Claims, 3 Drawing Sheets

(51) Int. Cl.
*C10G 7/02* (2006.01)
*C10G 45/02* (2006.01)
*C10G 11/18* (2006.01)
*B01D 19/00* (2006.01)
*C10G 65/06* (2006.01)
*B01D 3/40* (2006.01)
*C10G 45/08* (2006.01)
*C10L 1/00* (2006.01)

(52) U.S. Cl.
CPC .............. *C10G 11/18* (2013.01); *C10G 45/02* (2013.01); *C10G 45/08* (2013.01); *C10G 45/32* (2013.01); *C10G 65/06* (2013.01); *C10L 1/00* (2013.01); *C10G 2300/104* (2013.01); *C10G 2300/1044* (2013.01); *C10G 2300/202* (2013.01); *C10G 2400/02* (2013.01); *C10L 2200/0423* (2013.01)

(56) References Cited

U.S. PATENT DOCUMENTS

| | | |
|---|---|---|
| 9,505,993 B2 | 11/2016 | Gornay |
| 2006/0096893 A1 | 5/2006 | De Almeida |

\* cited by examiner

PROCESS FOR THE TREATMENT OF A GASOLINE BY SEPARATION INTO THREE CUTS

The present invention relates to a process for reducing the quantity of sulphur-containing compounds in an olefinic type gasoline, in order to produce a gasoline that is said to be desulphurized, while limiting the octane number loss induced by the hydrogenation of the olefins and reducing the operating and investment costs.

PRIOR ART

The production of gasolines complying with new environmental standards requires a substantial reduction in their sulphur content to values which generally do not exceed 50 ppm (mg/kg), and are preferably less than 10 ppm.

It is also known that converted gasolines, and more particularly those obtained from catalytic cracking, which may represent 30% to 50% of the gasoline pool, have high olefins and sulphur contents.

For this reason, almost 90% of the sulphur present in the gasolines can be attributed to gasolines obtained from catalytic cracking processes, which will henceforth be termed FCC (Fluid Catalytic Cracking) gasoline. FCC gasolines thus constitute the preferred feed for the process of the present invention.

Among the possible pathways for producing fuels with a low sulphur content, that which has become very popular consists of specifically treating the sulphur-rich gasoline bases using hydrodesulphurization processes in the presence of hydrogen and a catalyst. Traditional processes desulphurize the gasolines in a non-selective manner by hydrogenating a large proportion of the monoolefins, which results in a substantial drop in the octane number and a high hydrogen consumption. The most recent processes, such as the Prime G+ process (trade mark), can be used to desulphurize olefin-rich cracked gasolines while limiting the hydrogenation of monoolefins and as a result the octane number drop and the high consumption of hydrogen that ensues. Examples of processes of this type are described in patent applications EP1 077 247 and EP 1 174 485.

As described in patent applications EP 1 077 247 and EP 1 800 748, it is advantageous to carry out a step for selective hydrogenation of the feed to be treated prior to the hydrotreatment step. This first hydrogenation step essentially consists of selectively hydrogenating the diolefins, while at the same time transforming the saturated light sulphur-containing compounds by making them heavier (by increasing their molecular weight). These sulphur-containing compounds may have a boiling point that is lower than the boiling point of thiophene, such as methanethiol, ethanethiol, propanethiol and dimethylsulphide. By fractionating the gasoline obtained from the selective hydrogenation step, a light desulphurized gasoline cut (or LCN, Light Cracked Naphtha) mainly composed of monoolefins containing 5 or 6 carbon atoms is produced without a loss of octane number, which can be upgraded to the gasoline pool in order to formulate a vehicle fuel. Under specific operating conditions, this hydrogenation selectively carries out hydrogenation, at least partial or even total, of the diolefins present in the feed to be treated into monoolefinic compounds which have a better octane number. Another effect of selective hydrogenation is to prevent the gradual deactivation of the selective hydrodesulphurization catalyst and/or to avoid gradual clogging of the reactor due to the formation of polymerization gums at the surface of the catalysts or in the reactor. In fact, polyunsaturated compounds are unstable and have a tendency to form gums by polymerization.

Patent application EP 2 161 076 discloses a process for the selective hydrogenation of polyunsaturated compounds, and more particularly of diolefins, in order to carry out joint molecular weight increase of the light sulphur-containing compounds such as mercaptans or sulphides. That process employs a catalyst containing at least one metal from group VIb and at least one non-noble metal from group VIII deposited on a porous support.

Obtaining a gasoline with a very low sulphur content, typically with a content of less than 10 ppm by weight as required in Europe, also requires at least one hydrodesulphurization step, which consists of converting the organosulphur compounds into $H_2S$. However, if this step is not controlled correctly, it may cause hydrogenation of a large proportion of the monoolefins present in the gasoline, which then results in a substantial drop in the octane number of the gasoline as well as an over-consumption of hydrogen. Another problem encountered during the hydrodesulphurization step is the formation of mercaptan type compounds resulting from the addition reaction of the $H_2S$ formed in the hydrodesulphurization reactor onto the monoolefins present in the gasoline feed. Mercaptans, with chemical formula R—SH, where R is an alkyl group, are also known as thiols or recombinant mercaptans and generally represent between 20% and 80% by weight of the residual sulphur in the desulphurized gasolines.

In order to limit these disadvantages, various solutions have been described in the literature for desulphurizing cracked gasolines with the aid of a combination of steps for hydrodesulphurization and elimination of recombinant mercaptans by a carefully selected technique so as to avoid hydrogenation of the monoolefins present in order to preserve the octane number (see, for example, U.S. Pat. Nos. 7,799,210, 6,960,291, 6,387,249 and US 2007/114156).

However, it appears that although these combinations using a final step for elimination of recombinant mercaptans are particularly suitable when a very low sulphur content is desired, they can prove to be very expensive when the quantity of mercaptans to be eliminated is high; in fact, this requires high adsorbent or solvent consumptions, for example.

Some of the solutions proposed in the literature for the production of gasolines with a reduced sulphur content propose the separation by distillation of full range cracked naphtha (or FRCN) obtained from a cracking process. In some patents (for example the patents EP 1 077 247 and WO 02/072738), distillation is intended to obtain 2 cuts: a light cut (LCN) and a heavy cut (HCN, or Heavy Cracked Naphtha). The FRCN gasoline may be treated upstream of the distillation, for example using a process that can allow selective hydrogenation of the diolefins of the gasoline and/or to allow the molecular weight of the light sulphur-containing compounds to be increased, in a manner such that after the distillation operation, these sulphur-containing compounds are recovered in the heavy cut, HCN. The sulphur-containing compounds of the heavy cut are then eliminated from the gasoline by various processes, for example via a catalytic hydrodesulphurization carried out with one or more reactors.

Another solution consists of carrying out catalytic hydrodesulphurization of the gasoline feed in two hydrodesulphurization steps with an intermediate step for separation of the $H_2S$ formed in the first step. A solution of this type is illustrated, for example, in patents EP 1 174 485 and U.S. Pat. No. 7,785,461.

Some patents also concern solutions combining separation into a heavy cut and a light cut and a catalytic hydrodesulphurization carried out with two reactors with separation of the H$_2$S formed in the first step. In this case, the separation of the light cut may be carried out either upstream of the two hydrodesulphurization steps, as illustrated in the patent EP 1 354 930, only the heavy cut then being desulphurized, or between the two hydrodesulphurization steps, the first step then treating the full range gasoline obtained from a cracking process (or FRCN, Full Range Cracked Naphtha); the second step treats only the heavy cut. Examples of this latter solution have in particular been illustrated in U.S. Pat. Nos. 6,913,688 and 7,419,586.

Other solutions employ separation by distillation of the full range gasoline FRCN into more than two cuts in order to produce a gasoline with a reduced sulphur content or even with very low sulphur contents, of the order of 10 ppm by weight. In this type of process, the cuts obtained are treated separately or partially combined to eliminate organic sulphur from at least a portion of the cuts obtained, the aim being to obtain a desulphurized gasoline after mixing all or at least a portion of the treated cuts.

As an example, patent application US2004/188327 describes a process that can be used to reduce the sulphur content of a FCC gasoline by separating the FRCN gasoline into three cuts by means of a distillation operation: a light cut, an intermediate cut and a heavy cut. The heavy cut is desulphurized and the effluent is combined with the intermediate cut, and then it is desulphurized in its entirety during a second hydrodesulphurization step. It is specified that the mercaptans contained in the light cut may be eliminated either by thioetherification upstream of the separation into three cuts, or by a caustic downstream treatment.

The patent U.S. Pat. No. 6,103,105 describes a similar process, the FRCN (Full Range Cracked Naphtha) gasoline also being separated into three cuts by means of a distillation operation. It is specified that the light cut represents between 50% and 80% of the gasoline and that the heavy cut represents 5% to 20% of the FRCN gasoline. It is also specified that the intermediate cut and the heavy cut are hydrodesulphurized in a single reactor containing two catalytic beds. The heavy cut is treated in the first catalytic bed and the intermediate cut is added between the two beds so as to carry out a co-treatment with the partially desulphurized heavy cut obtained from the first bed in the second catalytic bed. The authors indicate that elimination of the sulphur is almost complete and also that hydrogenation of the olefins of the heavy cut is almost complete.

The patent FR 2 807 061 also describes a process for the desulphurization of gasoline comprising a selective hydrogenation step followed by separation into at least three fractions. The lightest fraction is practically free of sulphur. The heaviest fraction is treated at least once in order to desulphurize it of the unsaturated sulphur-containing compounds in the cut. The intermediate fraction is characterized by an olefins and aromatics content which is relatively low. Part or all of that cut undergoes at least one desulphurization and denitrogenation step followed by a catalytic reforming step.

The patent U.S. Pat. No. 9,260,672 describes a process for the production of gasoline with a small loss of octane number. In accordance with the inventors, after saturation of the diolefins, the FRCN gasoline is separated by distillation into a light cut with an end point of 70° C., an intermediate cut (70-90° C.) and a heavy cut (90-210° C.). The mercaptans of the light cut are eliminated with a caustic treatment in equipment known as CFC equipment (for Continuous Film Contactor). The heavy cut, containing principally thiophene sulphur-containing compounds, is desulphurized by a catalytic hydrodesulphurization or reactive adsorption process. The intermediate cut may be sent to an isomerization unit or catalytic reforming unit. Optionally, the intermediate cut may be co-treated with the light cut in CFC equipment in order to reduce the mercaptans content, or in fact this cut may be co-treated with the heavy cut. That process does not propose a separate desulphurization treatment for the intermediate cut.

The patent application US 2004/0195151 discloses a process for the selective desulphurization of FRCN gasoline. The FRCN gasoline is introduced into a reactive distillation column in order to both carry out a thioetherification treatment of the mercaptans contained in the feed and a separation into a light cut, an intermediate cut and a heavy cut. The intermediate cut is withdrawn as a side stream and is treated in a desulphurization reactor.

The patent application US 2014/0054198 describes a process for reducing the sulphur content of a stream of hydrocarbons, the process comprising bringing a FRCN gasoline into contact with a hydrogenation catalyst in order to hydrogenate at least a portion of the dienes and convert at least a portion of the mercaptans into thioethers. This FRCN gasoline is then fractionated into a light fraction, an intermediate fraction and a heavy fraction. The heavy fraction is desulphurized in a catalytic hydrodesulphurization process. The intermediate fraction is mixed with hydrogen and a gas oil cut in order to form a mixture which is brought into contact with a catalyst in a hydrodesulphurization reactor then separated in order to obtain the desulphurized intermediate fraction and to recover the gas oil cut which is recycled to the process and optionally purged.

One aim of the present invention is to propose a process for the desulphurization of an olefinic gasoline comprising a fractionation into three cuts which are capable of producing, by limiting the loss of octane number, a gasoline with a low total sulphur content, typically less than 30 ppm, or more preferably less than 10 ppm by weight and with a very low recombinant mercaptans content.

SUMMARY OF THE INVENTION

The present invention concerns a process for the treatment of a gasoline containing sulphur-containing compounds, olefins and diolefins, the process comprising at least the following steps:
  a) fractionating the gasoline in order to recover a light gasoline cut LCN and a first heavy gasoline cut HCN;
  b) carrying out a first step for desulphurization of the first heavy gasoline cut HCN in the presence of a hydrodesulphurization catalyst and hydrogen, at a temperature in the range 160° C. to 450° C., at a pressure in the range 0.5 to 8 MPa, with a liquid velocity in the range 0.5 to 20 h$^{-1}$ and with a ratio between the flow rate of hydrogen, expressed in normal m$^3$ per hour, and the flow rate of feed to be treated, expressed in m$^3$ per hour under standard conditions, in the range 50 Nm$^3$/m$^3$ to 1000 Nm$^3$/m$^3$ in a manner such as to produce a first desulphurization effluent;
  c) partially condensing the first desulphurization effluent obtained from step b) in a manner such as to produce a gaseous phase essentially constituted by hydrogen and H$_2$S and a liquid hydrocarbon phase HCN comprising dissolved H$_2$S;

d) separating the liquid hydrocarbon phase HCN into an intermediate gasoline cut MCN and a second heavy gasoline cut HHCN;

e) carrying out a second step for desulphurization of the second heavy gasoline cut HHCN in the presence of a hydrodesulphurization catalyst and hydrogen, at a temperature in the range 160° C. to 450° C., at a pressure in the range 0.5 to 8 MPa, with a liquid velocity in the range 0.5 to 20 h$^{-1}$ and with a ratio between the flow rate of hydrogen, expressed in normal m$^3$ per hour, and the flow rate of feed to be treated, expressed in m$^3$ per hour under standard conditions, in the range 50 Nm$^3$/m$^3$ to 1000 Nm$^3$/m$^3$ in a manner such as to produce a desulphurized second heavy gasoline cut HHCN, the process comprising:

a step c') in which the dissolved H$_2$S of the liquid hydrocarbon phase HCN obtained from step c) is separated in order to produce a liquid hydrocarbon phase HCN with a low dissolved H$_2$S content and said liquid hydrocarbon phase HCN with a low dissolved H$_2$S content being treated in step d), or a step d') in which the dissolved H$_2$S of the intermediate gasoline cut MCN obtained from step d) is separated in order to produce an intermediate gasoline cut MCN with a low dissolved H$_2$S content.

The process in accordance with the invention solves the problem of desulphurizing an olefinic gasoline while limiting hydrogenation of the olefins and reducing the recombinant mercaptans content in the desulphurized effluents because of the combination of steps mentioned above. Thus, step a) is operated in a manner such as to separate a light gasoline cut with a high octane number and a reduced sulphur-containing compounds content without having to involve a catalytic hydrodesulphurization reaction which would bring about a hydrogenation of a portion of the olefins. Step b) carries out a partial desulphurization of the HCN gasoline cut (complementary to the LCN cut) during which recombinant mercaptans are formed obtained by reaction of the olefins with the H$_2$S formed. Step d) participates in the efficiency of the process because of the separation of the partially desulphurized HCN gasoline cut, which is operated carefully, into an intermediate MCN gasoline cut with a low sulphur content and into a second heavy gasoline cut HHCN containing organic sulphur-containing compounds including the recombinant mercaptans which have higher boiling temperatures than those of the olefins from which they are obtained. Step e) for desulphurization of the second heavy gasoline cut HHCN, which may be operated under more severe conditions than in step b) because the most olefin-rich fractions have already been separated, can be used to carry out an intense treatment in order to provide an effluent with a low sulphur content.

The process in accordance with the invention also comprises a step for the separation of the H$_2$S which is produced during the desulphurization step b) and wherein a portion is in the dissolved form in the liquid hydrocarbons phase obtained from step c). This separation step is intended to provide, in the end, a heavy gasoline cut HHCN with a low H$_2$S content which may then be treated in the desulphurization step e). The H$_2$S may be separated directly on the liquid hydrocarbon phase HCN obtained from step c) (step c'). Alternatively, the process in accordance with the invention comprises a step for the separation of H$_2$S (step d') which is carried out after the step d) for separation of the liquid hydrocarbon phase HCN into an intermediate gasoline cut MCN (and which also contains H$_2$S) and a second heavy gasoline cut HHCN which is heavier than the MCN cut. This step d') is thus carried out on the intermediate gasoline cut MCN which contains the majority of the H$_2$S formed. As an example, step d') consists of sending the intermediate cut MCN and a gas which can be used to entrain the dissolved H$_2$S present in the gasoline cut MCN to a stripping column. Step d') may also employ a stabilization column for separating a C4$^-$ cut containing H$_2$S at the head of the column and a stabilized MCN cut at the column bottom.

Step a) is carried out in a manner such that the final boiling point of the light gasoline cut provides a light gasoline cut LCN with a low sulphur content (total sulphur content typically less than 30 ppm by weight and preferably less than 10 ppm by weight) without necessitating a subsequent hydrodesulphurization step.

Preferably, the intermediate gasoline cut MCN has a temperature difference ($\Delta T$) between the points corresponding to 5% and 95% of the distilled weight which is less than 75° C. (measured in accordance with the CSD method described in the document Oil Gas Sci. Technol. Vol. 54 (1999), No. 4, pp. 431-438). Preferably, the difference in temperature $\Delta T$ between the 5% and 95% distilled weight points is in the range 20° C. to 65° C. The intermediate gasoline cut MCN may contain hydrocarbons containing 5 to 8 carbon atoms and mainly hydrocarbons containing 6 carbon atoms.

In accordance with the invention, steps c') or d') are carried out by stripping with a gas. As an example, the stripping gas is hydrogen, nitrogen or steam.

Alternatively, steps c') or d') are carried out by an absorption method.

In accordance with another embodiment of the process, steps c') or d') are carried out in a stabilization column configured to separate a C4$^-$ hydrocarbon phase containing H$_2$S and a liquid hydrocarbon phase HCN (stabilized) with a low dissolved H$_2$S content, said liquid hydrocarbon phase HCN with a low dissolved H$_2$S content being treated in step d).

In accordance with another embodiment, steps c') and d) are carried out concomitantly in a fractionation column in order to separate:

a gaseous phase essentially containing H$_2$S which is withdrawn from the head of the column;

the intermediate gasoline cut MCN which is withdrawn from the reflux drum or as a side stream below the column head;

the second heavy gasoline cut, HHCN purified of dissolved H$_2$S, which is withdrawn from the bottom of the column.

In this case and preferably, the intermediate gasoline cut MCN obtained from fractionation is sent to a stabilization column, optionally to that which is used to treat the desulphurized HHCN cut obtained in step e).

In accordance with the invention, the intermediate gasoline cut MCN is optionally treated in a hydrodesulphurization step f). The step f) is carried out in the presence of a hydrodesulphurization catalyst and hydrogen, at a temperature in the range 160° C. to 450° C., at a pressure in the range 0.5 to 8 MPa, with a liquid velocity in the range 0.5 to 20 h$^{-1}$ and with a ratio between the flow rate of hydrogen, expressed in normal m$^3$ per hour, and the flow rate of feed to be treated, expressed in m$^3$ per hour under standard conditions, in the range 50 Nm$^3$/m$^3$ to 1000 Nm$^3$/m$^3$.

Preferably, the desulphurized intermediate gasoline cut MCN obtained from step f) is sent to a stabilization column.

In an alternative embodiment, the intermediate gasoline cut MCN is treated in a liquid/liquid extraction process or extractive distillation or adsorption in a manner such as to produce an intermediate gasoline cut MCN with a low thiophenic sulphur-containing compounds content.

Advantageously, prior to step a), the gasoline is treated in the presence of hydrogen and a selective hydrogenation catalyst in a manner such as to at least partially hydrogenate the diolefins and to carry out a reaction for increasing the molecular weight of a portion of the sulphur-containing compounds, step a) being operated at a temperature in the range 100° C. to 190° C., at a pressure in the range 1 to 4 MPa, with a space velocity in the range 1 to 20 $h^{-1}$ and with a ratio between the flow rate of hydrogen, expressed in normal $m^3$ per hour and the flow rate of feed to be treated expressed in $m^3$ per hour under standard conditions, in the range 2 $Nm^3/m^3$ to 100 $Nm^3/m^3$.

The hydrodesulphurization catalysts for steps b) and e) comprise at least one element from group VIII, at least one element from group VIb and a support.

The process in accordance with the invention is employed in order to treat a gasoline cut obtained from a catalytic cracking or thermal cracking unit such as, for example, a delayed coker or a visbreaking unit.

BRIEF DESCRIPTION OF THE DRAWINGS

Other characteristics and advantages of the invention will become apparent from reading the following description, given solely by way of non-limiting illustration and made with reference to the following figures.

In general, similar elements are denoted by identical references in the figures.

DESCRIPTION OF THE FEED

The process in accordance with the invention can be used to treat any type of olefinic gasoline cut containing sulphur, for which the boiling point range typically extends from approximately the boiling points of hydrocarbons containing 2 or 3 carbon atoms ($C_2$ or $C_3$) to approximately 250° C., preferably from approximately the boiling points of hydrocarbons containing 2 or 3 carbon atoms ($C_2$ or $C_3$) to approximately 220° C., more preferably from approximately the boiling points of hydrocarbons containing 4 carbon atoms to approximately 220° C. The process in accordance with the invention may also be used to treat feeds with end points below those mentioned above such as, for example, a C5-200° C. or C5-160° C. cut.

The process in accordance with the invention may preferably be used to treat a gasoline cut obtained from a catalytic cracking or thermal cracking unit such as, for example, a delayed coker or a visbreaking unit. A feed obtained by mixing cuts obtained from these various origins is also possible. In particular, the gasoline cut from the process in accordance with the invention is obtained from a catalytic cracking unit the feed for which has been pre-treated or which functions in a manner such as to increase or even maximize the propylene yield. In this latter case, the mode of operation of a catalytic cracking unit is typically characterized by severe operating conditions (high temperature and with a high ratio of catalyst to feed), by using a catalyst comprising a zeolite with form selectivity (for example with a MFI crystalline structure), with an optional recycle of a portion of the gasoline cut produced or an oligomerate of the C4 cut in the catalytic cracking unit, this recycled stream possibly being treated either at the same time as the feed (known as coprocessing) or in a dedicated reactor in order to uncouple the conditions for cracking the heavy feed and those for the recycled stream (known as a two-riser process).

The sulphur content of gasoline cuts produced by catalytic cracking (FCC) or non-catalytic cracking depends on the sulphur content of the treated feed, on the presence or absence of pre-treatment of the feed, and also on the end point of the cut. In general, the sulphur contents of the gasoline cut as a whole, in particular those from FCC, are more than 100 ppm by weight and the majority of the time more than 500 ppm by weight. For gasolines with end points of more than 200° C., the sulphur contents are often more than 1000 ppm by weight, and may even in some cases reach values of the order of 4000 to 5000 ppm by weight.

As an example, the gasolines obtained from catalytic cracking units (FCC) contain, on average, between 0.5% and 5% by weight of diolefins, between 20% and 50% by weight of olefins, and between 10 ppm and 0.5% by weight of sulphur, generally including less than 300 ppm of mercaptans. The mercaptans are generally concentrated in the light fractions of the gasoline and more precisely in the fraction with a boiling point of less than 120° C.

The sulphur-containing species contained in the feeds treated by the process of the invention may be mercaptans or heterocyclic compounds such as, for example, thiophenes or alkylthiophenes, or heavier compounds such as benzothiophene, for example. In contrast to mercaptans, these heterocyclic compounds cannot be eliminated by extractive processes. These sulphur-containing compounds are consequently eliminated by a hydrotreatment which results in their transformation into hydrocarbons and $H_2S$.

Figure 1:
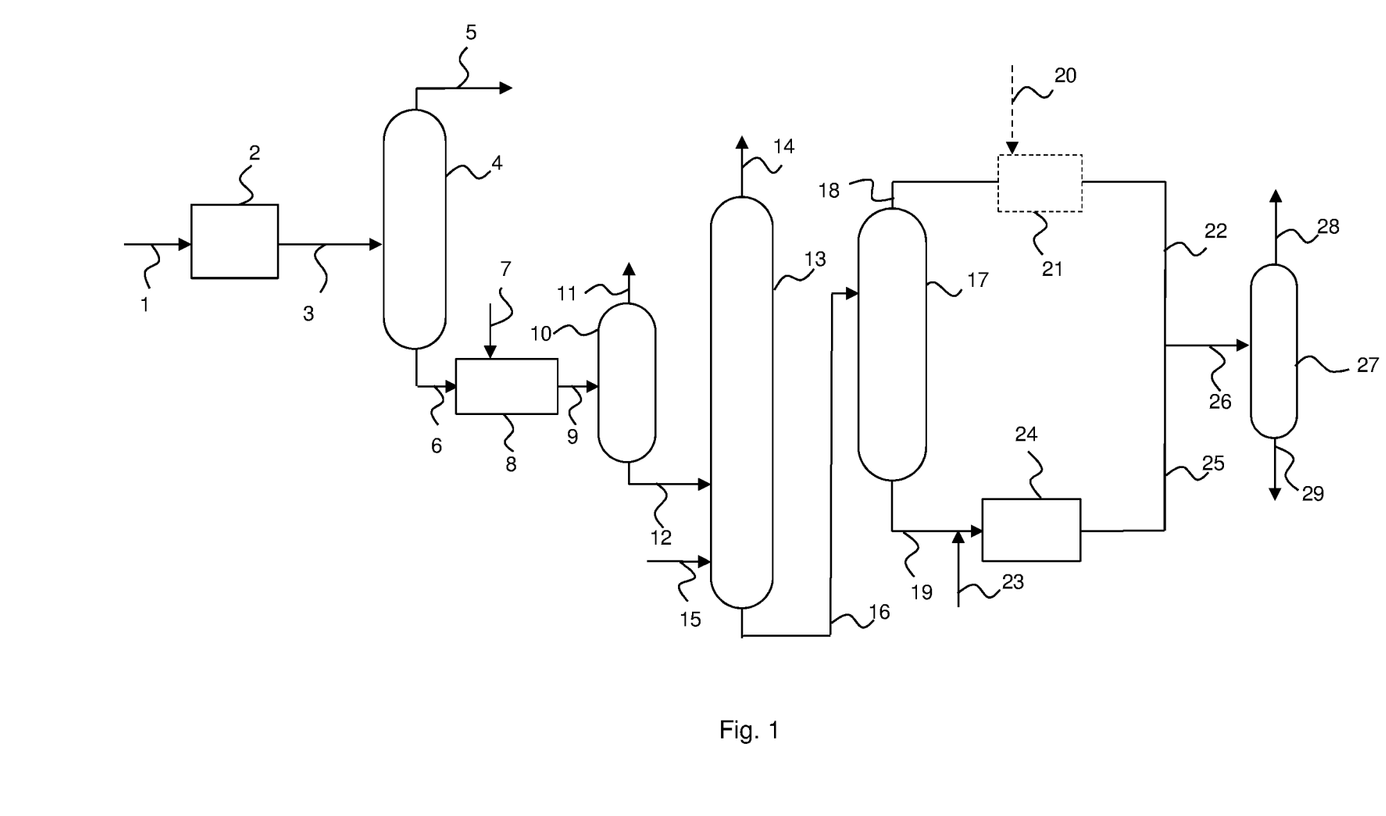
FIG. 1 is a first flow diagram for the process in accordance with the invention.

Referring now to FIG. 1, which represents a particular embodiment of the invention, an olefinic gasoline feed, for example a catalytically cracked gasoline described above, is treated in an optional step which carries out the selective hydrogenation of the diolefins and the conversion (molecular weight increase) of a portion of the mercaptan compounds (RSH) present in the feed into thioethers, by reaction with the olefins. Typically, the mercaptans which may react during the optional selective hydrogenation step are the following (non-exhaustive list): methyl mercaptan, ethyl mercaptan, n-propyl mercaptan, iso-propyl mercaptan, iso-butyl mercaptan, tert-butyl mercaptan, n-butyl mercaptan, sec-butyl mercaptan, iso-amyl mercaptan, n-amyl mercaptan, α-methylbutyl mercaptan, α-ethylpropyl mercaptan, n-hexyl mercaptan, and 2-mercapto-hexane. To this end, the FRCN gasoline feed is sent, via the line 1, to a selective hydrogenation catalytic reactor 2 containing at least one fixed or moving bed of catalyst for the selective hydrogenation of diolefins and for increasing the molecular weight of the mercaptans. The reaction for the selective hydrogenation of diolefins and for increasing the molecular weight of the mercaptans is preferably carried out on a sulphurized catalyst comprising at least one element from group VIII (groups 8, 9 and 10 of the new periodic classification, Handbook of Chemistry and Physics, 76th edition, 1995-1996) and optionally at least one element from group VIb (group 6 of the new periodic classification, Handbook of Chemistry and Physics, 76th edition, 1995-1996) and a support. The element from group VIII is preferably selected from nickel and cobalt, and in particular nickel. The element from group VIb, when it is present, is preferably selected from molybdenum and tungsten; highly preferably, it is molybdenum.

The catalyst support is preferably selected from alumina, nickel aluminate, silica, silicon carbide or a mixture of these oxides. Preferably, alumina is used, and more preferably, high purity alumina. In accordance with a preferred embodiment, the selective hydrogenation catalyst contains nickel in a content by weight of nickel oxide (in the form of NiO) in the range 4% to 12%, and molybdenum in an amount, as the amount by weight of molybdenum oxide (in the form of $MoO_3$), in the range 6% to 18%, and a nickel/molybdenum molar ratio in the range 1 to 2.5, the metals being deposited on a support constituted by alumina and wherein the degree of sulphurization of the metals constituting the catalyst is more than 80%.

During the optional selective hydrogenation step, the gasoline to be treated is typically brought into contact with the catalyst at a temperature in the range 50° C. to 250° C., and preferably in the range 80° C. to 220° C., and yet more preferably in the range 90° C. to 200° C., with a liquid space velocity (LHSV) in the range 0.5 $h^{-1}$ to 20 $h^{-1}$, the unit for the liquid space velocity being a litre of feed per litre of catalyst and per hour (L/L·h). The pressure is in the range 0.4 MPa to 5 MPa, preferably in the range 0.6 to 4 MPa and yet more preferably in the range 1 to 2 MPa. The optional selective hydrogenation step is typically carried out with a $H_2$/HC ratio in the range 2 to 100 $Nm^3$ of hydrogen per $m^3$ of feed, preferably in the range 3 to 30 $Nm^3$ of hydrogen per $m^3$ of feed.

The entirety of the feed is generally injected into the inlet to the reactor. However, it may in some cases be advantageous to inject a fraction or all of the feed between two consecutive catalytic beds placed in the reactor. This embodiment means that, in particular, the reactor can continue to be operated if the inlet to the reactor becomes blocked by deposits of polymers, particles or gums present in the feed.

As indicated in FIG. 1, the olefinic gasoline feed is sent to the selective hydrogenation reactor 2 via the line 1. An effluent with low diolefins and mercaptans contents is withdrawn from the reactor 2 via the line 3 and is sent, in accordance with step a), into a fractionation column 4 (or splitter) configured in order to separate the gasoline into two cuts: a light gasoline cut LCN 5 (or light gasoline) and a (first) intermediate heavy gasoline cut HCN 6, which is constituted by the heavy fraction which is complementary to the light gasoline LCN. The final boiling point of the light cut is selected in a manner such as to provide a light gasoline cut LCN with a low sulphur content (total sulphur content typically less than 30 ppm by weight and preferably less than 10 ppm by weight) without necessitating a subsequent hydrodesulphurization step. Thus, preferably, the light gasoline cut LCN is a $C5^-$ hydrocarbon cut (i.e. containing hydrocarbons containing 5 and fewer than 5 carbon atoms per molecule). The first heavy gasoline cut HCN, which is preferably a $C6^+$ cut (i.e. containing hydrocarbons containing 6 and more than 6 carbon atoms per molecule), is treated in a selective hydrodesulphurization step b) (selective HDS). The aim of this step b) is to convert a portion of the sulphur-containing compounds of the heavy gasoline cut HCN into $H_2S$ and hydrocarbons using a catalyst described below and hydrogen.

The first heavy gasoline cut 6 HCN is then brought into contact with hydrogen supplied via the line 7 and a selective HDS catalyst in at least one hydrodesulphurization unit 8 which comprises at least one reactor with a fixed or moving bed of catalyst. The hydrodesulphurization reaction is generally carried out at a temperature in the range 160° C. to 450° C., at a pressure in the range 0.5 to 8 MPa. The liquid space velocity is generally in the range 0.5 to 20 $h^{-1}$ (expressed as the volume of liquid per volume of catalyst per hour), preferably in the range 1 to 8 $h^{-1}$. The ratio of the $H_2$/first heavy gasoline cut, HCN, is adjusted as a function of the desired degrees of hydrodesulphurization to be in the range 50 to 1000 normal $m^3$ per $m^3$ under standard conditions. Preferably, the mixture of the first heavy gasoline cut HCN with the hydrogen brought into contact with the catalyst in step b) is entirely in the vapour phase. Preferably, the temperature is in the range 200° C. to 400° C., and more preferably in the range 200° C. to 350° C. Preferably, the pressure is in the range 1 to 3 MPa.

The selective HDS catalyst employed in the sulphurized form comprises at least one element from group VIII (groups 8, 9 and 10 of the new periodic classification, Handbook of Chemistry and Physics, 76th edition, 1995-1996), at least one element from group VIb (group 6 of the new periodic classification, Handbook of Chemistry and Physics, 76th edition, 1995-1996) and a support. The element from group VIII is preferably selected from nickel and cobalt, and in particular is cobalt. The element from group VIb is preferably selected from molybdenum and tungsten, and yet more preferably is molybdenum. The catalyst may, for example, be a catalyst as described in the patents FR 2 840 315, FR 2 840 316, FR 2 904 242 or FR 3 023 184. The support for the catalyst is preferably selected from alumina, nickel aluminate, silica, silicon carbide, or a mixture of these oxides. Preferably, alumina is used.

It should be noted that the hydrogen supplied via the line 7 may be makeup hydrogen or recycle hydrogen originating from a step of the process, in particular from step b). Preferably, the hydrogen of line 7 is makeup hydrogen. The first desulphurization effluent obtained from step b) evacuated via the line 9 is then cooled and partially condensed so as to produce two phases in the separator 10 (step c): a gaseous phase 11 which is rich in hydrogen and containing a portion of the $H_2S$ produced by the desulphurization in step b), and a liquid hydrocarbon phase HCN 12 containing dissolved $H_2S$, unconverted sulphur-containing compounds and recombinant mercaptans.

As can be seen in FIG. 1, the liquid hydrocarbon phase HCN 12 comprising dissolved $H_2S$ withdrawn from the separator 10 is sent to a step for separation of the dissolved $H_2S$ (step c'). In the embodiment of FIG. 1, this step c') is carried out in a column 13 for stripping $H_2S$. The liquid hydrocarbon phase HCN comprising dissolved $H_2S$ 12 is brought into contact with a gas such as hydrogen supplied to the $H_2S$ stripping column 13 via the line 15, from which a gaseous stream 14 containing the stripping gas and $H_2S$ is withdrawn from the head and, from the column bottom, the liquid hydrocarbon phase HCN with a low dissolved $H_2S$ content 16. It should be noted that when the stripping gas is hydrogen, the gaseous stream 14 may advantageously be treated in order to separate hydrogen from the $H_2S$ in a manner such as to produce a stream of purified hydrogen which may be recycled to a hydrodesulphurization unit, for example to the first hydrodesulphurization unit 8. For the $H_2S$ elimination step is it also possible to use an absorption device using amines, for example, in place of a stripping unit. The liquid hydrocarbon phase HCN with a low dissolved $H_2S$ content 16, which is preferably a $C6^+$ cut (i.e. containing hydrocarbons which may preferably contain 6 and more than 6 carbon atoms per molecule) is, in accordance with step d) of the process, sent to a fractionation column 17 configured to separate an intermediate gasoline cut MCN overhead which is withdrawn via the line 18 and a second heavy gasoline cut HHCN withdrawn from the bottom via the line 19. Given that step b) is operated in a manner such as to provide a high conversion of light thiophenic sulphur-containing compounds (mainly thiophene and methyl thiophenes), the intermediate gasoline cut MCN obtained after the fractionation of step d) contains only small amounts of unconverted thiophenic sulphur-containing compounds. Because of the fractionation step d), the intermediate gasoline cut MCN is also freed from the majority of the recombinant mercaptans contained in the effluent which are formed during the hydrodesulphurization step b). In general, the recombinant mercaptans have boiling temperatures which are higher than those of the olefins from which they are obtained. As an example, 2-methyl-2-pentene (boiling point when pure under normal conditions: 67° C.) can form a recombinant mercaptan containing 5 carbon atoms such as 2-methyl-2-pentanethiol (boiling point when pure under normal conditions: 125° C.). This property is thus used in step d) to produce an intermediate gasoline cut MCN with a low sulphur and recombinant mercaptans content because said recombinant mercaptans for which the boiling temperature is higher than that of the intermediate gasoline cut MCN are entrained in the second heavy gasoline cut HHCN.

In order to obtain the intermediate gasoline cut MCN, the operating conditions for the fractionation column are adjusted in order to obtain a hydrocarbon cut for which the temperature difference (ΔT) between the temperatures corresponding to 5% and to 95% of the distilled weight is less than or equal to 75° C., preferably in the range 20° C. to 65° C. The temperature corresponding to 5% of the distilled weight of the intermediate gasoline cut MCN is preferably in the range 50° C. to 80° C. and the temperature corresponding to 95% of the distilled weight of the intermediate gasoline cut MCN is preferably in the range 88° C. to 125° C. As an example, the intermediate gasoline cut MCN has a temperature corresponding to 5% of the distilled weight which is equal to 65° C.±2° C., or equal to 60° C.±2° C. or equal to 55° C.±2° C. Preferably, the intermediate gasoline cut MCN has a temperature corresponding to 95% of the distilled weight which is equal to 120° C.±2° C., or even equal to 115° C.±2° C. The method used to determine the temperatures corresponding to 5% and 95% of the distilled weight has been described in the document Oil Gas Sci. Technol. Vol. 54 (1999), No. 4, pp. 431-438 with the name "CSD method» (abbreviation for "Conventional Simulated Distillation").

In a preferred embodiment, the intermediate gasoline cut MCN essentially contains hydrocarbons containing 6 or 7 carbon atoms, and mainly hydrocarbons containing 6 carbon atoms.

Typically, the total organic sulphur content in the intermediate gasoline cut MCN recovered at the head of the fractionation column of step d) is less than 30 ppm by weight, preferably less than 15 ppm by weight and more preferably less than 10 ppm by weight of the total sulphur.

In accordance with step e) of the process, the second heavy gasoline cut HHCN is treated by hydrodesulphurization. Said gasoline cut, withdrawn from the bottom of the column 17 via the line 19, is brought into contact with hydrogen supplied via the line 23 in at least one hydrodesulphurization unit 24. This selective hydrodesulphurization step e) may thus be used to convert the sulphur-containing compounds of the heavy gasoline cut HHCN (including the major portion of the recombinant mercaptans formed in the hydrodesulphurization step b)) into $H_2S$ and hydrocarbons. The selective hydrodesulphurization step e) is operated in the presence of hydrogen supplied via the line 23 and a selective hydrodesulphurization catalyst which comprises at least one element from group VIII (groups 8, 9 and 10 of the new periodic classification, Handbook of Chemistry and Physics, 76th edition, 1995-1996), at least one element from group VIb (group 6 of the new periodic classification, Handbook of Chemistry and Physics, 76th edition, 1995-1996) and a support. The element from group VIII is preferably selected from nickel and cobalt, and in particular is cobalt. The element from group VIb is preferably selected from molybdenum and tungsten, and highly preferably is molybdenum. The catalyst may, for example, be a catalyst as described in the patents FR 2 840 315, FR 2 840 316, FR 2 904 242 or FR 3 023 184. The hydrodesulphurization reaction is generally carried out at a temperature in the range 200° C. to 450° C., at a pressure in the range 0.5 to 8 MPa. The liquid space velocity is generally in the range 0.5 to 20 $h^{-1}$ (expressed as the volume of liquid per volume of catalyst per hour), preferably in the range 1 to 8 $h^{-1}$. The $H_2$/HHCN cut ratio which is adjusted as a function of the desired degrees of hydrodesulphurization is in the range 50 to 1000 normal $m^3$ per $m^3$ under standard conditions.

Preferably, the temperature is in the range 200° C. to 400° C., and highly preferably in the range 200° C. to 350° C. Preferably, the pressure is in the range 0.5 to 3 MPa.

At the end of step e), a second heavy gasoline cut HHCN which has been desulphurized is withdrawn from the selective hydrodesulphurization unit via the line 25, and typically has an organic sulphur content of less than 30 ppm by weight, preferably less than 15 ppm by weight and more preferably less than 10 ppm by weight.

Optionally, the intermediate gasoline cut MCN 18 is also treated in a hydrodesulphurization step. To this end, it is brought into contact with hydrogen supplied via the line 20 and a selective hydrodesulphurization catalyst in at least one hydrodesulphurization unit 21 which comprises at least one reactor with a fixed or moving bed of catalyst (optional step f)). The hydrodesulphurization reaction is generally carried out at a temperature in the range 160° C. to 450° C., at a pressure in the range 0.5 to 8 MPa. The liquid space velocity is generally in the range 0.5 to 20 $h^{-1}$ (expressed as the volume of liquid per volume of catalyst per hour), preferably in the range 1 to 8 $h^{-1}$. The ratio of the $H_2$/intermediate gasoline cut, MCN, is adjusted as a function of the desired degrees of hydrodesulphurization to be in the range 50 to 1000 normal $m^3$ per $m^3$ under standard conditions. Preferably, the mixture of the intermediate gasoline cut MCN with the hydrogen brought into contact with the catalyst in the optional step f) is entirely in the vapour phase. Preferably, the temperature is in the range 200° C. to 400° C., and more preferably in the range 200° C. to 350° C. Preferably, the pressure is in the range 1 to 3 MPa. The catalyst employed in step f) may be a catalyst of the type used for steps b) and e). It should be noted that the hydrogen supplied via the line 20 may be makeup hydrogen or recycle hydrogen originating from a step of the process.

The process may comprise a step for stabilization of the effluents obtained from steps e) and f) for hydrodesulphurization of the gasoline cuts HHCN and MCN respectively in order to separate out the light hydrocarbons fraction $C4^-$ mixed with the $H_2S$ formed during the hydrodesulphurization steps, plus hydrogen. In accordance with the embodiment of FIG. 1, the desulphurized intermediate gasoline cuts MCN from line 22 and the second heavy gasoline cut HHCN from line 25 are sent as a mixture via the line 26 to a stabilization column 27 from which the C4⁻ hydrocarbons fraction mixed with $H_2S$ is withdrawn from the head of the column via the line 28 and a stabilized mixture of desulphurized gasolines MCN and HHCN is withdrawn from the bottom of the column via the line 29.

Alternatively, the residual thiophenic sulphur-containing compounds contained in the intermediate gasoline cut MCN may be extracted with an appropriate polar solvent in a liquid-liquid extraction process or extractive distillation process, or in fact by adsorption onto appropriate adsorbents (silicas, aluminas, zeolites such as those described in the document FR 2 889 539 A1).

The light gasoline cuts LCN and the mixture of desulphurized gasolines MCN and HHCN produced by the process in accordance with the invention are advantageously used as bases for the formulation of a gasoline fuel.

In accordance with another embodiment, which is not shown, the process does not employ the step c') for separating the $H_2S$ dissolved in the liquid hydrocarbon phase HCN, but employs a step d') downstream of the step d) for separating the intermediate gasoline cut MCN and the second heavy gasoline cut HHCN. Step d') consists of removing the $H_2S$ present in the intermediate gasoline cut MCN obtained in step d). As an example, step d') is carried out by stripping with a gas or by employing a stabilization column which separates a stream containing a C4⁻ hydrocarbons cut and $H_2S$ from the head of the column and a stabilized intermediate gasoline cut MCN from the bottom.

Figure 2:
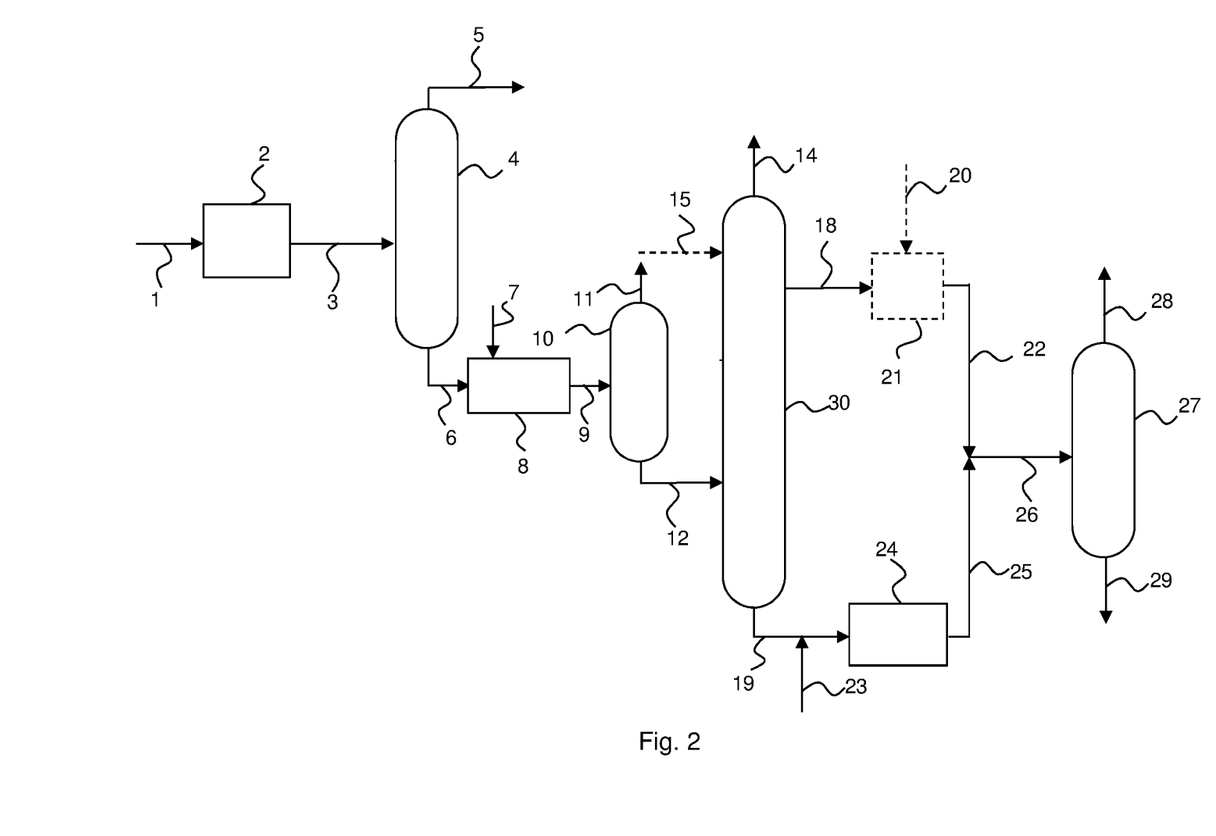
FIG. 2 is a process flow diagram for a variation of the process in accordance with the invention.

FIG. 2 is a flow diagram for the process in accordance with another embodiment. This embodiment is distinguished from that of FIG. 1 by the method of carrying out steps c') and d). Referring to FIG. 2, the liquid hydrocarbon phase HCN comprising dissolved $H_2S$ obtained from step c) is sent via the line 12 to a fractionation column 17' designed and operated so as to carry out steps c') and d) concomitantly in order to separate:
- a gaseous phase essentially containing $H_2S$ which is withdrawn from the head of the column 17' via the line 14;
- the intermediate gasoline cut MCN 18 which is withdrawn as a side stream several plates below the column head;
- the second heavy gasoline cut HHCN 19 which is withdrawn from the bottom of the column.

Column 17' may optionally be supplied via line 15 with a stripping gas such as hydrogen in order to improve the separation of $H_2S$.

The intermediate gasoline cut MCN 18 may then be treated in a hydrodesulphurization reactor as already indicated in FIG. 1 (optional step f) and then stabilized alone or as a mixture with the desulphurized second heavy gasoline cut HHCN obtained from step e).

Figure 3:
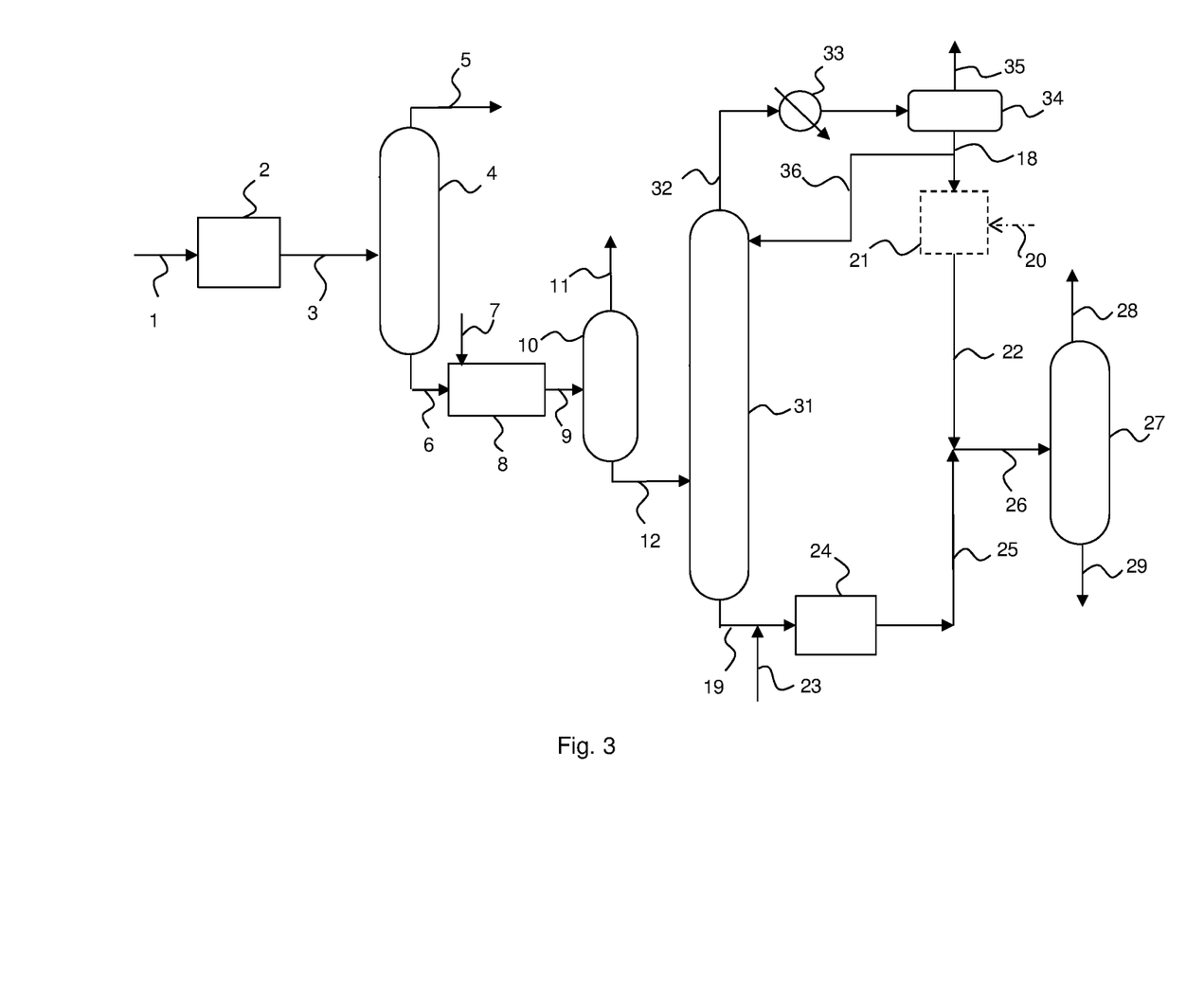
FIG. 3 is a process flow diagram for another variation of the process in accordance with the invention.

FIG. 3 shows an alternative embodiment of the process in accordance with the invention, in which steps c') and d) are carried out concomitantly in a fractionation column 17" configured to separate:
- a gaseous phase containing hydrocarbons of the intermediate gasoline cut MCN and $H_2S$ from the head of the column (line 18');
- the second heavy gasoline cut HHCN (with a low dissolved $H_2S$ content) which is withdrawn from the bottom of the column via the line 19.

The gaseous phase 18' is then cooled in order to condense the intermediate gasoline cut MCN. To this end, said gaseous phase 18' is cooled using a chiller unit 30 and the cooled effluent is then sent to a separator drum 31 in order to recover a gaseous stream 32 essentially containing hydrogen and $H_2S$ optionally with light hydrocarbons, and a liquid hydrocarbon phase 18 from the bottom of the drum corresponding to the intermediate gasoline cut MCN. As indicated in FIG. 3, a portion of the intermediate gasoline MCN 18 is recycled to the fractionation column 17" as a reflux liquid. The other portion of the intermediate gasoline MCN may be hydrodesulphurized (in the optional step f) or simply stabilized. The step for stabilization of the intermediate gasoline cut MCN (desulphurized or not) may be operated as a mixture with the second heavy gasoline cut HHCN desulphurized in the column 27.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 16/59.016, filed Sep. 26, 2016, are incorporated by reference herein.

Example 1: Pre-Treatment of the FCC Gasoline Feed by Selective Hydrogenation

Table 1 provides the characteristics of a FRCN gasoline treated using the process in accordance with FIG. 1 of the present invention.

The FCC gasoline (line 1) was treated in the selective hydrogenation reactor 2 in the presence of a catalyst A (optional step). Catalyst A was of the NiMo on gamma alumina type. The respective quantities of metals were 7% by weight NiO and 11% by weight $MoO_3$ with respect to the total catalyst weight, i.e. a Ni/Mo molar ratio of 1.2. The specific surface area of the catalyst was 230 $m^2/g$. Prior to using it, catalyst A was sulphurized at atmospheric pressure on a sulphurization bank under a $H_2S/H_2$ mixture constituted by 15% by volume of $H_2S$ for 1 L/g·h of catalyst and at 400° C. over two hours. This protocol could be used to obtain a degree of sulphurization of more than 80%.

The FRCN gasoline (line 1) was brought into contact with hydrogen in a reactor which contained the catalyst A. This step of the process carried out selective hydrogenation of the diolefins and conversion (increasing the molecular weight) of a portion of the mercaptans compounds (RSH) present in the feed. The diolefins content was directly proportional to the value for the MAV (Maleic Anhydride Value). Diolefins are unwanted compounds because they are the precursors of gums in the gasolines.

The operating conditions employed in the selective hydrogenation reactor were: Temperature: 140° C., Total pressure: 2.5 MPa, Added $H_2$/FRCN gasoline feed volume ratio: 5 normal litres of hydrogen per litre of gasoline (vol/vol), hourly space velocity (VVH): 3 $h^{-1}$.

TABLE 1

Characteristics of the FRCN feed (1) and the selective hydrogenation effluent (3).

|  |  | Line 1 FRCN | Line 3 Selective hydrogenation effluent |
|---|---|---|---|
| Organic sulphur content | (ppm by weight S) | 978 | 980 |
| MAV | (mg/g) | 12 | 0.6 |
| Olefins content | (% by weight) | 31% | 31% |
| Simulated distillation |  |  |  |
| 5% distilled weight | (° C.) | 23 | 23 |
| 50% distilled weight | (° C.) | 95 | 95 |
| 95% distilled weight | (° C.) | 198 | 198 |

The effluent from the selective hydrogenation step 3 with a low conjugated diolefins content (MV=0.6 mg/g) and a low light sulphur-containing compounds content (molecular weight increased in the selective hydrogenation step) was sent to a fractionation column 4 in accordance with step a) of the present invention in order to separate a light gasoline LCN 5 at the head of the column and a first heavy gasoline cut HCN 6 from the bottom of the column. The characteristic of the light gasoline LCN and of the first heavy gasoline cut HCN are indicated in Table 2. As indicated in Table 2, the LCN gasoline obtained (line 5) had a low sulphur content (15 ppm). The first heavy gasoline cut HCN, which corresponded to approximately 68% by weight of the FRCN gasoline, had a very high sulphur content (1430 ppm) and necessitated a supplemental treatment before being incorporated into the gasoline pool.

TABLE 2

Characteristics of cuts: light gaseous LCN and first heavy gasoline cut HCN

|  |  | Line 5 LCN | Line 6 HCN |
|---|---|---|---|
| Percentage by weight of cut | % | 32 | 68 |
| Organic sulphur content | (ppm by weight S) | 15 | 1430 |
| Olefins content | (% by weight) | 48% | 23% |

Example 2 (Comparative): Hydrodesulphurization of the First Heavy Gasoline Cut HCN This example makes reference to the prior art (patent EP 1 174 485). The first heavy gasoline cut HCN obtained in Example 1 was mixed with hydrogen and treated in a selective hydrodesulphurization unit 8 which corresponded to a first hydrodesulphurization step. The first hydrodesulphurization step was carried out in the presence of a CoMo catalyst supported on alumina (HR806 sold by Axens). The pressure was 2 MPa, the liquid hourly space velocity (expressed as the volume of liquid per volume of catalyst and per hour) was 4 h$^{-1}$, the H$_2$/HCN cut ratio was 360 normal m$^3$ per m$^3$ under standard conditions. The effluent from the reactor was then condensed, 10, and stripped, 13, with hydrogen in order to extract the dissolved H$_2$S. The organic sulphur content and the olefins content of the liquid hydrocarbon phase HCN with a low H$_2$S content (line 16) are indicated in Table 3.

The liquid hydrocarbon phase HCN with a low H$_2$S content (16) was then treated in a second selective hydrodesulphurization unit 24 which corresponded to a second hydrodesulphurization step. This step was carried out in the presence of a CoMo catalyst supported on alumina (HR806 sold by Axens). The pressure was 2 MPa, the liquid space velocity (expressed as the volume of liquid per volume of catalyst and per hour) was 4 h$^{-1}$, the H$_2$/HCN cut ratio was 360 normal m$^3$ per m$^3$ under standard conditions. The effluent from the reactor could, for example, be sent to a stabilization column in order to recover hydrogen and H$_2$S from the head of the column, optionally with light hydrocarbons, and a hydrocarbon cut HCN obtained from a second hydrodesulphurization step from the column bottom. The characteristics of the HCN obtained after the second step for hydrodesulphurization and stabilization are illustrated in Table 3.

TABLE 3

Characteristics of the heavy gasoline HCN after the first and the second hydrodesulphurization step

|  |  | Heavy hydrodesulphurized gasoline HCN First step | Heavy hydrodesulphurized gasoline HCN Second step |
|---|---|---|---|
| Organic sulphur content | (ppm S) | 150 | 15 |
| Olefins content | (% by weight) | — | 15 |

TABLE 4

Loss of olefins between the first heavy gasoline cut HCN and the gasoline obtained after the second hydrodesulphurization step

|  |  | Loss of olefins (absolute) |
|---|---|---|
| Loss of olefins | (% by weight) | 7.8% |

The process in accordance with Example 2 could be used to obtain a HCN gasoline with a low sulphur content (15 ppm by weight). The loss of olefins between the first heavy gasoline cut HCN and the stabilized gasoline obtained after the second hydrodesulphurization step was 7.8% by weight (in absolute terms).

Example 3: Hydrodesulphurization of the First Heavy Gasoline Cut HCN (In Accordance with the Present Invention)

This example makes reference to the present invention. The first heavy gasoline cut HCN obtained in Example 1 was mixed with hydrogen and treated in a selective hydrodesulphurization unit 8 which corresponded to step b) of the present invention. The hydrodesulphurization step b) was carried out in the presence of a CoMo catalyst supported on alumina (HR806 sold by Axens). The pressure was 2 MPa, the liquid space velocity (expressed as the volume of liquid per volume of catalyst and per hour) was 4 h$^{-1}$, the H$_2$/HCN cut ratio was 360 normal m$^3$ per m$^3$ under standard conditions. The effluent from the reactor 8 was then condensed (in accordance with step c) of the invention) in order to eliminate the hydrogen and hydrogen sulphide in the vapour phase. The liquid hydrocarbon phase HCN comprising dissolved H$_2$S was sent to a stripping step (step c') in accordance with the invention) illustrated by the stripping column 13 of FIG. 1. A gaseous stream 14 containing the stripping gas and H$_2$S was withdrawn from the head of the column and a liquid hydrocarbon phase HCN with a low dissolved H$_2$S content 16 was withdrawn from the bottom of the column.

The liquid hydrocarbon phase HCN with a low dissolved H$_2$S content (and which had been at least partially hydrodesulphurized in step b) was sent to a fractionation column 17 (step d) in accordance with the present invention). The column was configured to separate an intermediate gasoline cut MCN overhead which was withdrawn via the line 18, and a second heavy gasoline cut HHCN was withdrawn from the bottom via the line 19. The operation of the fractionation column was regulated in a manner such as to obtain a MCN cut for which the temperature at 95% of the distilled weight for the intermediate gasoline cut MCN was 102° C.±5° C. (temperatures measured using the CSD method described in the document Oil Gas Sci. Technol. Vol. 54 (1999), No. 4, pp. 431-438). The operation of the fractionation column was also regulated in a manner such as to obtain from the bottom of the column a second heavy gasoline cut HHCN for which the temperature for 5% of the distilled weight was 102° C.±5° C. (temperatures measured using the CSD method described in the document Oil Gas Sci. Technol. Vol. 54 (1999), No. 4, pp. 431-438).

The second heavy gasoline cut HHCN 19 was mixed with hydrogen and treated in a selective hydrodesulphurization unit 24 in accordance with step e) of the present invention. The hydrodesulphurization step e) was carried out in the presence of a CoMo catalyst supported on alumina (HR806 sold by Axens). The pressure was 2 MPa, the liquid hourly space velocity (expressed as the volume of liquid per volume of catalyst and per hour) was 4 h$^{-1}$, the H$_2$/HCN cut ratio was 360 normal m$^3$ per m$^3$ under standard conditions. The desulphurized second heavy gasoline cut HHCN was stabilized after step e).

The characteristics of the intermediate gasoline cut MCN 18, the second heavy gasoline cut HHCN 19 and the desulphurized second heavy gasoline cut HHCN (after stabilization) are indicated in Table 5.

TABLE 5

Characteristics of the liquid hydrocarbon phase HCN with a low H$_2$S content, the intermediate gasoline cut MCN, the second heavy gasoline cut HHCN and the second, heavy gasoline cut HHCN desulphurized and stabilized in accordance with the present invention

| | | Liquid hydrocarbon phase HCN with low H$_2$S content Line 16 | Intermediate gasoline cut MCN | Second heavy gasoline cut HHCN | Second, heavy gasoline cut HHCN desulphurized and stabilized |
|---|---|---|---|---|---|
| Organic sulphur content | (ppm by weight S) | 72 | 15 | 107 | 15 |
| Olefins content | (% by weight) | 17% | 28% | 10% | 9% |
| Percentage by weight of cut (with respect to FRCN) | (% by weight) | 68% | 26% | 42% | 42% |

TABLE 6

Loss of olefins between the first heavy gasoline cut HCN and the mixture of intermediate cut gasoline cut MCN and desulphurized and stabilized second heavy gasoline HHCN

| | | Loss of olefins (absolute) |
|---|---|---|
| Loss of olefins | (% by weight) | 6.6% |

Thus, the process in accordance with the invention can be used to obtain, after stabilization, an intermediate gasoline cut MCN with a low organic sulphur content (15 ppm) and, after stabilization, a second desulphurized heavy gasoline cut HHCN with a low organic sulphur content (15 ppm). With the light gasoline LCN obtained in Example 1, these gasolines can be upgraded in the gasoline pool for the formulation of vehicle fuel.

Highly advantageously, the mixture of the first heavy gasoline cut HCN and the mixture of intermediate gasoline cut MCN and desulphurized and stabilized second heavy gasoline cut HHCN gasolines (in accordance with Example 3 of the present invention) can be used to produce a gasoline with a low sulphur content (15 ppm S), while at the same time reducing the absolute olefins loss compared with a desulphurized heavy gasoline HCN after the second desulphurization step (presented in the comparative Example 2). In fact, in Example 2, the loss of olefins (as a % by weight) between the first heavy gasoline cut HCN and the gasoline obtained after the second hydrodesulphurization step was 7.8% and in Example 3 in accordance with the invention, the loss of olefins between the first heavy gasoline cut HCN and the mixture of intermediate gasoline cut MCN and desulphurized and stabilized second heavy gasoline cut HHCN was 6.6%. Thus, Example 3 in accordance with the invention can be used to preserve 15% relative of the olefins present in the first heavy gasoline cut, while at the same time producing a gasoline with a low sulphur content (15 ppm). The preservation of the olefins present in the first heavy gasoline cut HCN has a positive impact on the octane numbers of the gasoline produced.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A process for the desulphurization of a gasoline containing sulphur-containing compounds, olefins and diolefins, the process comprising at least the following:
   a) fractionating the gasoline in order to recover a light gasoline cut LCN and a first heavy gasoline cut HCN;
   b) carrying out a first desulphurization of the first heavy gasoline cut HCN in the presence of a hydrodesulphurization catalyst and hydrogen, at a temperature in the range 160° C. to 450° C., at a pressure in the range 0.5 to 8 MPa, with a liquid velocity in the range 0.5 to 20 h$^{-1}$ and with a ratio between the flow rate of hydrogen, expressed in normal m$^3$ per hour, and the flow rate of feed to be treated, expressed in m$^3$ per hour under standard conditions, in the range 50 Nm³/m³ to 1000 Nm³/m³ in a manner such as to produce a first desulphurization effluent;

c) partially condensing the first desulphurization effluent obtained from b) in a manner such as to produce a gaseous phase of hydrogen and H₂S and a liquid hydrocarbon phase HCN' comprising dissolved H₂S;

d) separating the liquid hydrocarbon phase HCN' into an intermediate gasoline cut MCN and a second heavy gasoline cut HHCN;

e) carrying out a second desulphurization of the second heavy gasoline cut HHCN in the presence of a hydrodesulphurization catalyst and hydrogen, at a temperature in the range 160° C. to 450° C., at a pressure in the range 0.5 to 8 MPa, with a liquid velocity in the range 0.5 to 20 h⁻¹ and with a ratio between the flow rate of hydrogen, expressed in normal m³ per hour, and the flow rate of feed to be treated, expressed in m³ per hour under standard conditions, in the range 50 Nm³/m³ to 1000 Nm³/m³ in a manner such as to produce a desulphurized second heavy gasoline cut HHCN, the process comprising:

c') in which the dissolved H₂S of the liquid hydrocarbon phase HCN' obtained from step c) is separated in order to produce a liquid hydrocarbon phase HCN" with a reduced dissolved H₂S content and said liquid hydrocarbon phase HCN" with a reduced dissolved H₂S content being treated in d), or d') in which the dissolved H₂S of the intermediate gasoline cut MCN obtained from d) is separated in order to produce an intermediate gasoline cut MCN with a reduced dissolved H₂S content.

2. The process as claimed in claim 1, in which c') or d') is carried out by stripping with a gas.

3. The process as claimed in claim 1, in which c') or d') is carried out by means of an absorption method.

4. The process as claimed in claim 1, in which c') or d') is carried out in a stabilization column configured to separate a C4⁻ hydrocarbon phase containing H₂S and the liquid hydrocarbon phase HCN with a reduced dissolved H₂S content.

5. The process as claimed in claim 1, in which c') and d) are carried out concomitantly in a fractionation column configured to separate:

a gaseous phase essentially containing H₂S which is withdrawn from the head of the column;
the intermediate gasoline cut MCN which is withdrawn as a side stream below the column head;
the second heavy gasoline cut HHCN which is withdrawn from the bottom of the column.

6. The process as claimed in claim 1, in which c') and d) are carried out concomitantly in a fractionation column configured to separate:

a gaseous phase containing hydrocarbons and H₂S from the head of the column;
the second heavy gasoline cut HHCN which is withdrawn from the bottom of the column;
and in which said gaseous phase is cooled and condensed in a manner such as to produce a gaseous stream essentially containing H₂S and the intermediate gasoline cut MCN.

7. The process as claimed in claim 6, in which the intermediate gasoline cut MCN is sent to a stabilization column.

8. The process as claimed in claim 1, in which the intermediate gasoline cut MCN has a temperature difference ΔT between the 5% and 95% distilled weight points which is less than or equal to 75° C.

9. The process as claimed in claim 8, in which the temperature difference ΔT between the 5% and 95% distilled weight points for the intermediate gasoline cut MCN is in the range 20° C. to 65° C.

10. The process as claimed in claim 1, in which the second desulphurized heavy gasoline cut HHCN obtained from e) is sent to a stabilization column.

11. The process as claimed in claim 1, in which the intermediate gasoline cut MCN is treated in a hydrodesulphurization f).

12. The process as claimed in claim 11, in which the desulphurized intermediate gasoline cut MCN obtained from f) is sent to a stabilization column.

13. The process as claimed in claim 1, in which the intermediate gasoline cut MCN is treated in a liquid/liquid extraction process or an extractive distillation process or adsorption process in a manner such as to produce an intermediate gasoline cut MCN with a reduced thiophenic sulphur-containing compounds content.

14. The process as claimed in claim 1, in which prior to a), the gasoline is treated in the presence of hydrogen and a selective hydrogenation catalyst in a manner such as to at least partially hydrogenate the diolefins and carry out a reaction to increase the molecular weight of a portion of the sulphur-containing compounds, a) being operated at a temperature in the range 50° C. to 250° C., at a pressure in the range 0.4 to 5 MPa, with a space velocity in the range 0.5 to 20 h⁻¹ and with a ratio between the flow rate of hydrogen expressed in normal m³ per hour and the flow rate of the feed to be treated expressed in m³ per hour under standard conditions, in the range 2 Nm³/m³ to 100 Nm³/m³.

15. The process as claimed in claim 1, in which the hydrodesulphurization catalysts of b) and e) comprise at least one element from group VIII, at least one element from group VIb and a support.

16. The process as claimed in claim 1, in which the gasoline cut is obtained from a catalytic cracking or thermal cracking unit.

* * * * *